(12) United States Patent
Richter

(10) Patent No.: US 7,712,712 B2
(45) Date of Patent: May 11, 2010

(54) OBJECT CARRIER WITH FLEXIBLE EXCHANGEABLE SUPPORT ARM

(76) Inventor: Harald Richter, Höhenstrasse 32, 75332 Engelbrand (DE)

( * ) Notice: Subject to any disclaimer, the term of this patent is extended or adjusted under 35 U.S.C. 154(b) by 0 days.

(21) Appl. No.: 11/650,527

(22) Filed: Jan. 5, 2007

(65) Prior Publication Data
US 2007/0205239 A1 Sep. 6, 2007

(30) Foreign Application Priority Data
Mar. 4, 2006 (DE) .................. 20 2006 003 411 U

(51) Int. Cl.
*F16M 11/00* (2006.01)
*E04G 3/00* (2006.01)

(52) U.S. Cl. ................. 248/161; 248/282.1; 248/205.5; 403/349

(58) Field of Classification Search ................ 248/161, 248/160, 282.1, 205.5; 403/348.349
See application file for complete search history.

(56) References Cited

U.S. PATENT DOCUMENTS

| | | | | |
|---|---|---|---|---|
| 1,647,053 A | * | 10/1927 | Pfaffle | ................... 362/282 |
| 2,111,368 A | * | 3/1938 | Kron | ...................... 248/160 |
| 2,637,233 A | * | 5/1953 | Hoffman | ................. 81/57.43 |
| 3,180,600 A | * | 4/1965 | Kopec | ..................... 248/104 |
| 4,714,222 A | * | 12/1987 | Kiesel et al. | ............. 248/282.1 |
| 4,842,174 A | * | 6/1989 | Sheppard et al. | ............ 224/548 |
| 6,749,160 B1 | * | 6/2004 | Richter | ..................... 248/206.2 |
| 6,942,188 B2 | * | 9/2005 | Tsay et al. | ............... 248/205.8 |
| 7,007,908 B2 | * | 3/2006 | Tsay | ....................... 248/309.3 |
| 7,011,279 B2 | * | 3/2006 | Richter | ....................... 248/160 |
| 7,226,026 B2 | * | 6/2007 | Lin | ......................... 248/205.5 |
| 2007/0018064 A1 | * | 1/2007 | Wang | ..................... 248/274.1 |
| 2007/0023594 A1 | * | 2/2007 | Choi et al. | ............... 248/205.5 |

FOREIGN PATENT DOCUMENTS

| | | |
|---|---|---|
| DE | 295 13 581 | 11/1995 |
| DE | 299 12 772 | 11/1999 |
| DE | 203 16 061 | 1/2004 |
| DE | 20 2004 005 825 | 7/2004 |
| DE | 20 2004 010 768 | 11/2004 |
| DE | 10 2004 010 031 | 6/2005 |
| DE | 1 652 729 | 5/2006 |

* cited by examiner

*Primary Examiner*—Anita M King
(74) *Attorney, Agent, or Firm*—Klaus J. Bach

(57) ABSTRACT

In an object carrier for supporting apparatus such as a mini-computer, a navigation apparatus or cell phones, which carrier comprises a foot adapted to be attached to a support surface, a top part for supporting an apparatus holder or directly an apparatus, and a flexible arm extending between the foot and the top part, the flexible arm is releasably connectable at least to the foot by a plug-in connection consisting of a receptacle part formed at least in the foot for receiving an end of the flexible arm in a rotationally fixed relationship and the plug-in connection further includes locking structure for firmly retaining, and releasably locking, the end of the flexible arm in the foot and respectively, top part.

4 Claims, 2 Drawing Sheets

OBJECT CARRIER WITH FLEXIBLE EXCHANGEABLE SUPPORT ARM

BACKGROUND OF THE INVENTION

The invention concerns an object carrier with a flexible exchangeable support arm for use for example in motor vehicles for the permanent or temporary support of an apparatus such as a cell phone. A minicomputer or a navigation apparatus etc. The object carrier comprises a mounting part, for example, a suction mechanism for attachment to a smooth surface such as a windshield or a console mountable to a support surface by means of screws, an apparatus or object holder for receiving and fixing a particular apparatus or object and a flexible support arm extending between the mounting part and the apparatus or object holder so that the apparatus or object can be arranged oriented in an operating position convenient for a user by appropriate bending of the support arm.

Such object carriers are known, for example, from German Utility Model 295 13 581, or from German Utility Model 20 2004 010 768. In such object carriers, particular attention has to be given to a secure, reliable connection between the flexible support arm, which is generally called gooseneck, and the foot and also between the support arm and the object holder since substantial forces are effective at those connections during an adjustment of the object carrier. Although the support arm is flexible, it is adjustable only by application of a substantial force since, under normal operation, the support arms needs to be relatively rigid, and should not change its position during operation when subjected to vibrations.

In known object carriers of this type, the connections between the flexible support arm and the foot, or respectively, object holder are established by cementing and other security measures.

It is the object of the present invention to provide an object carrier which is improved with respect to utility and operability.

SUMMARY OF THE INVENTION

In an object carrier for supporting apparatus such as a minicomputer, a navigation apparatus or a cell phone which carrier comprises a foot adapted to be attached to a support surface, a top part for supporting an apparatus holder or directly an apparatus, and a flexible arm extending between the foot and the top part, the flexible arm is releasably connectable at least to the foot by a plug-in connection consisting of a receptacle part formed at least in the foot for receiving an end of the flexible arm in a rotationally fixed relationship and the plug-in connection further includes locking means for firmly retaining and releasably locking the end of the flexible arm in the foot or respectively, top part.

Since support arms of different length can be used, that is, the support arm or gooseneck can be exchanged, the adaptability of the device to various conditions and circumstances is greatly expanded.

The connections between the gooseneck and the foot and, respectively, the object holder are established by a form-locking rotation-resistant plug-in connection between the flexible goose neck or, respectively, the end pieces thereof and the foot or, respectively, the object holder. The connections are locked at each end of the goose neck by a locking sleeve disposed on the respective goose neck which, by a screw- or bayonet connection or other rotating locking means, provides for locking or unlocking of the connection between the gooseneck and the foot or object holder.

The invention will become more readily apparent from the following description of a preferred embodiment with reference to the accompanying drawings.

DESCRIPTION OF A PREFERRED EMBODIMENT

Figure 1:
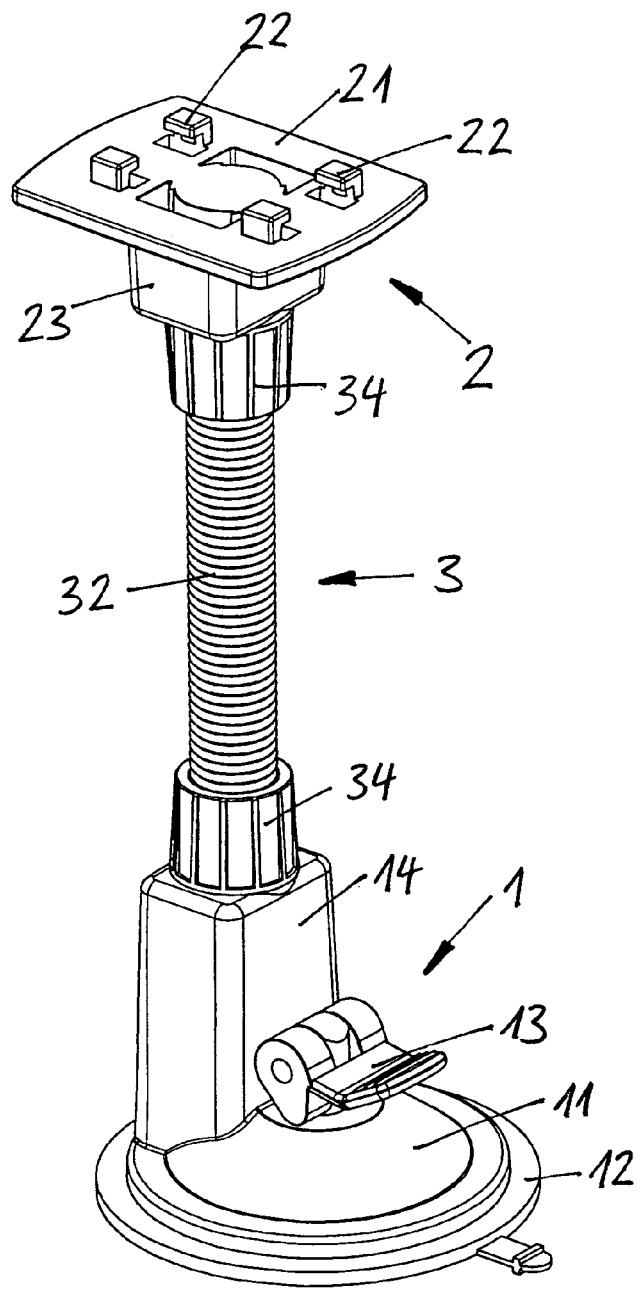
FIG. 1 is a perspective view of an object carrier according to the invention.

As shown in the figures, the object carrier comprises a foot 1, a top end 2 and a gooseneck 3 which extends between the foot 1 and the top end 2 and is connected thereto in each case by a combination of a plug-in connection and a releasable bayonet locking structure.

The foot 1 includes a suction housing 11, a suction membrane 12 extending across the bottom end of the suction housing 11 and a suction membrane operating lever 13 which is connected to the suction membrane 12 by way of a shaft. In addition, the foot 1 includes a mounting column 14 for attachment of the gooseneck 3.

The top end 2 comprises a mounting plate 21, which, by means of rapid coupling elements 22, is coupled to an apparatus holder or, possibly, directly to an apparatus housing. The mounting plate 21 is formed integrally with a connecting body 23 for mounting to the goose neck 3.

Figure 2:
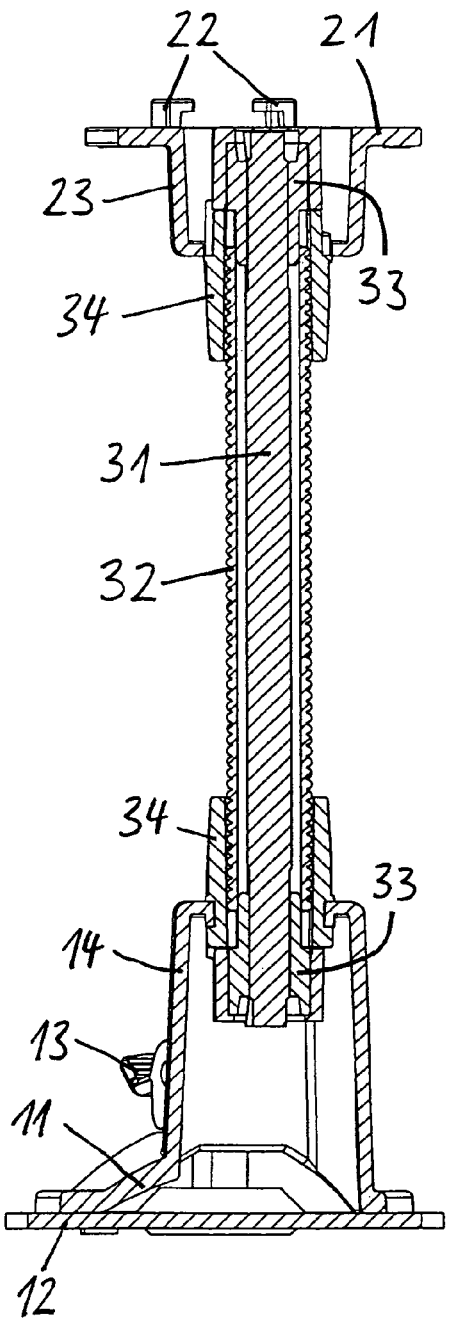
FIG. 2 is a longitudinal cross-sectional view of the object carrier shown in FIG. 1.

The object carrier shown in FIG. 1 in a perspective view is shown in FIG. 2 in a cross-sectional view. In FIG. 2, also the structure of the gooseneck is shown which generally comprises a flexible metal rod 31 surrounded, in spaced relationship, by a flexible elastic sleeve 32. The sleeve 32 consists for example of a corrugated plastic hose and serves mainly as a cover of the metal rod. It is provided at opposite ends with connecting members 33 and bayonet locking sleeves 34.

Figure 3:
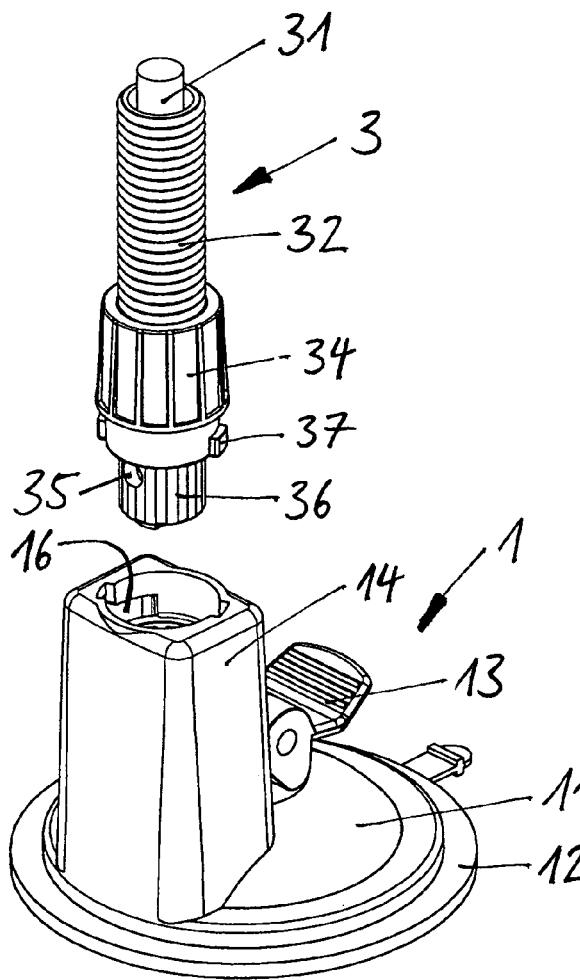
FIG. 3 is a perspective view of the foot and the respective bottom end section of the support arm of the object carrier.
Figure 4:
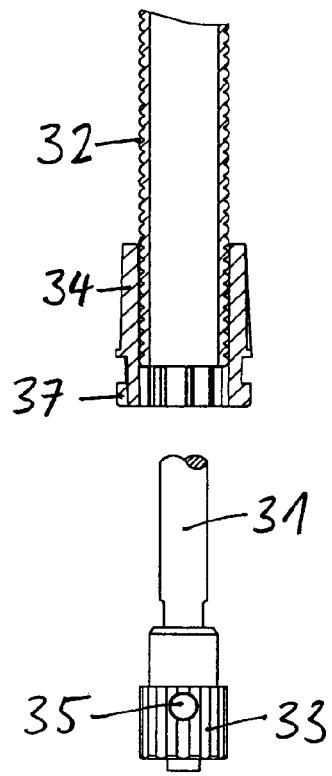
FIG. 4 shows the arrangement of FIG. 3 in an exploded view.
Figure 4:
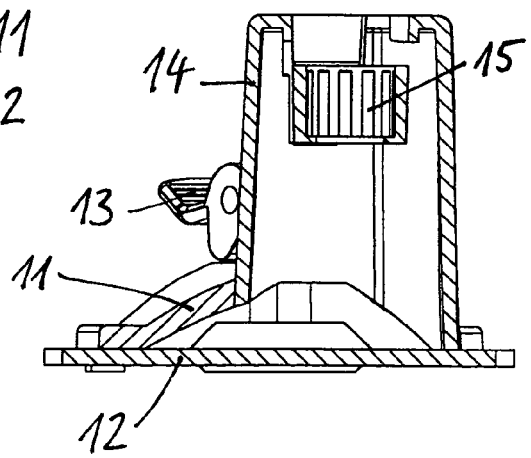

Particulars for forming the coupling connections between the respective ends of the gooseneck 3 with the foot 1 and, respectively, the top end 2 are shown in FIGS. 3 and 4 based on foot connection serving as an example also for the top end connection, which is the same. FIG. 3 shows the foot 1 with the respective end of the goose neck 3 in spaced relationship in order to show clearly the arrangement and design of the connecting member 33 with the bayonet locking sleeve 34.

The connecting member 33 is disposed on the respective end of the metal rod 31 and consists expediently of a plastic material. The connecting member 33 and the metal rod are firmly joined so that they cannot rotate relative to one another, preferably by a form-locking connection of the cross-section of the metal rod end and the respective accommodation opening of the connecting member 33 and/or a transverse rod which extends through the connecting member 33 and the metal rod 31. The transverse pin may form diametrically opposite radial projections 35 extending from the connecting member 33 or the projections may be formed onto the connecting member 33, which act as engagement structures for the bayonet locking device 34.

The lower part of the connecting member 33 is provided with an outer profile structure 36, which cooperates with an inner profile structure 15 in the mounting column 14 of the foot 1, or respectively, in the connecting body 23 of the top part 2 for preventing relative rotation between the connecting member 33 and the mounting column 14. It is also possible to provide the projections 35 in cooperation with corresponding axial grooves in the counter element of the foot 1 or, respectively the top part 2 for preventing relative rotation.

The bayonet locking sleeve 34 is movably disposed on the elastic sleeve 32 and includes radially projecting engagement structures 37, which cooperate with corresponding bayonet grooves 16 (FIG. 3).

The gooseneck is coupled with the foot 1 or, respectively, top part 2 in that, in each case, the connecting member 33 is inserted into the counter element of the foot 1 or respectively, the top part 2, and is secured thereto by rotation of the locking sleeve into form-locking engagement with the foot 1 or top part 2, respectively. In this position, the connecting member 33 is then held by the bayonet locking sleeve 34: The bayonet locking sleeve abuts with its front face the radial projections 35 of the connecting member 33 whereby the connecting member 33 is held axially in its inserted position in which it is locked to the counter element of the foot 1 or, respectively, the top part 2 by rotation of the bayonet locking sleeve 34.

As mentioned already earlier instead of a bayonet locking sleeve a threaded locking sleeve may be used or another locking element providing for the same result.

The configuration of the coupling elements, that is, the connecting member 33 and the bayonet locking sleeve 34 or other locking sleeve, is the same at both ends of the gooseneck 3 and the counter elements in the foot 1 and in the top part 2 are also identical so that it is not necessary to pay attention to the orientation of the gooseneck during assembly.

With this configuration of the object carrier, the gooseneck disposed between the foot and the top part can easily be exchanged so that for each application or each mounting situation the proper gooseneck can be selected from an assortment of available goosenecks of different lengths and installed between a foot and a top part. This provides for a building block system of object carrier with different goosenecks which simplifies warehousing and reduces costs since only an assortment of goosenecks of different lengths must be available stocked to which the same foot and top parts can be attached. A merchant can make available to his customers foot and top parts in connection with a goose neck of any desired length so that the customer can customize his or her purchase or even can purchase goose necks of different lengths for exchange as desired.

If the top part is a very simple connecting part, it is also possible to connect the simple top part firmly with one end of the goose neck and to provide a releasable connection only between the foot 1 and the other end of the goose neck 3. The releasable coupling between the goose neck and the foot 1 as well as the top part however has the additional advantage that also the top part is easily exchangeable, that is, different top parts with different support or engagement configurations for apparatus holders or apparatus of different manufacturers can be mounted.

What is claimed is:

1. An object carrier comprising: a foot (1) for attachment to a support surface, a top part (2) for supporting an apparatus holder or apparatus, and a flexible support arm (3) extending between the foot (1) and the top part (2), said flexible support arm (3) including a flexible metal support rod (31) surrounded by an elastic sleeve (32) and being releasably connectable to the foot (1) by a plug-in connection, said plug-in connection including a connecting member (33) firmly joined to an end of the metal support rod (31) so as to prevent relative rotation therebetween and a receptacle part (14, 23) formed in the foot (1) for receiving the connecting member (33), the connecting member (33) being provided circumferentially with at least one of a profile structure (36) and radially extending projections (35) for firm rotational engagement with the receptacle part (14, 23), which includes a complementary profile structure, the plug-in connection further including a locking sleeve (34) disposed on the elastic sleeve (32) and engaging the connecting member (33) for firmly retaining and releasably locking the connecting member (33) in the receptacle part (14, 33) formed in the respective foot (1) or respectively, top part (2).

2. An object carrier according to claim 1, wherein the flexible support arm (3) is releasably coupled to the foot (1) as well as to the top part (2).

3. An object carrier according to claim 2, wherein the plug-in connection at the opposite ends of the flexible support arm (3) are identical in size and configuration.

4. An object carrier according to claim 1, wherein said locking sleeve (34) is a bayonet sleeve having radially projecting locking elements (37) and the receptacle part (14) includes bayonet locking grooves (16) receiving the locking elements (37) for axially retaining and releasably locking the flexible support arm (3) in the receptacle part (14) of the foot (1).

* * * * *